United States Patent [19]
Chang

[11] Patent Number: 5,532,746
[45] Date of Patent: Jul. 2, 1996

[54] BIT ALLOCATION METHOD FOR CONTROLLING TRANSMISSION RATE OF VIDEO ENCODER

[75] Inventor: Sung H. Chang, Seoul, Rep. of Korea

[73] Assignee: Korea Telecommunication Authority, Seoul, Rep. of Korea

[21] Appl. No.: 336,807

[22] Filed: Nov. 9, 1994

[30] Foreign Application Priority Data

Nov. 9, 1993 [KR] Rep. of Korea ......... 93-23851

[51] Int. Cl.$^6$ ................................. H04N 7/32
[52] U.S. Cl. ............................. 348/415; 348/700
[58] Field of Search .................... 348/384, 390, 348/401, 405, 409, 412, 413, 416, 415, 407, 420, 699, 700; H04N 7/130, 7/137

[56] References Cited

U.S. PATENT DOCUMENTS

| | | | |
|---|---|---|---|
| 4,999,704 | 3/1991 | Ando | 348/401 |
| 5,099,322 | 3/1992 | Gove | 348/700 |
| 5,227,878 | 7/1993 | Puri et al. | 348/699 |
| 5,231,484 | 7/1993 | Gonzales et al. | 348/405 |
| 5,235,419 | 8/1993 | Krause | 348/700 |
| 5,272,529 | 12/1993 | Frederiksen | 348/405 |
| 5,359,365 | 10/1994 | Enokida | 348/390 |
| 5,404,174 | 4/1995 | Sugahara | 348/700 |
| 5,428,393 | 6/1995 | Enokida | 348/390 |
| 5,461,420 | 10/1995 | Yonemitsu et al. | 348/416 |

*Primary Examiner*—Thai Q. Tran
*Assistant Examiner*—Richard Lee
*Attorney, Agent, or Firm*—Morgan & Finnegan

[57] ABSTRACT

A bit allocation method for controlling a transmission rate of a video encoder having an intra mode, a predicted mode and a bidirectionally predicted mode. If the intra mode is selected, it is checked whether a scene change indicating signal is outputted. If the scene change indicating signal is not outputted, a bit amount corresponding to the intra mode is allocated to video data and the video data is coded in the intra mode. If the scene change indicating signal is outputted, a bit amount corresponding to the predicted mode is allocated to the video data, the scene change indicating signal is initialized and the video data is coded in the predicted mode. If a scene change is not present in the case where the predicted mode is selected, the bit amount corresponding to the predicted mode is allocated to the video data and the video data is coded in the predicted mode. If the scene change is present in the predicted mode, the scene change indicating signal is outputted, a bit amount approximate to that corresponding to the intra mode is allocated to the video data and the video data is coded in the predicted mode. In the case where the bidirectionally predicted mode is selected, a bit amount corresponding to the bidirectionally predicted mode is allocated to the video data and the data is coded in the bidirectionally predicted mode.

2 Claims, 3 Drawing Sheets

BIT ALLOCATION METHOD FOR CONTROLLING TRANSMISSION RATE OF VIDEO ENCODER

BACKGROUND OF THE INVENTION

1. Field of the Invention

The present invention relates in general to a video communication field, and more particularly to a bit allocation method for controlling a data transmission rate through a channel in an MPEG2 video encoder which realizes a video compression method for reducing a band width in data transmission.

2. Description of the Prior Art

It is anticipated that video information will be a very important information source in the future information society and the demand for communications using digital video compression and storage media will be explosively increased. In particular, an MPEG2 video algorithm can widely be applied to video compression methods for digital video communication media, storage media, multimedia and high definition television (HDTV).

A transmission rate control method is a very important one of the MPEG2 associated techniques because it is connected directly with a picture quality of a restored video signal.

Generally, in the case where color motion video data is to be expressed in a digital manner, there is required very much data amount. For this reason, the direct transmission or storage of the digital color motion video data results in a transmission channel or a storage device being wasteful. Therefore, video compression and expansion methods are used to reduce the data amount in the data transmission or storage.

Such a video compression method utilizes a property of video data having much redundancy. Namely, the video compression method is adapted to reduce the data amount in the transmission/storage by removing the redundancy of the video data.

In JTC1/SC29/WG11 as an affiliated organization of ISO/IEC, the standard MPEG1 of a motion video compression coding method for a storage medium in the 1.15 Mbps class was established in the year 1991 by a Moving Picture Experts Group (MPEG). Also, the standard MPEG2 of a motion video compression coding method for communication/storage/broadcasting in the 4 Mbps or more class is in progress as of the year 1993.

The MPEG2 in progress is a DCT/DPCM composite coding algorithm which utilizes discrete cosine transform (DCT) and motion compensation to remove spatial and time redundancies of an input video signal, respectively. The MPEG2 also utilizes a variable length code (VLC) to remove a statistic redundancy of the input video signal. For this reason, in a video encoder performing the video compression, the generated data amount is very variable according to a characteristic of the input video signal.

For the purpose of transmitting the variable output data from the video encoder through a channel of a fixed band, buffers are required respectively in the encoder and a decoder. In the encoder, the data to be transmitted through the channel must be prevented from overflowing the buffer or being exhausted therein. Also, the data amount must be controlled to be matched with a capacity of the transmission channel which is called a transmission rate control.

The transmission rate control is performed by adjusting a step size of a quantizer. Because the quantization of the quantizer is a lossy coding process, a picture quality of the decoded video signal from the decoder is greatly dependent on the transmission rate control.

In the other words, in the case where the step size of the quantizer is made large, the data amount transmitted to the buffer is reduced, whereas the quantized data is degraded in accuracy. For this reason, the picture quality of the decoded video signal is degraded as compared with that of the original video signal. On the contrary, in the case where the step size of the quantizer is made small, the quantized data is increased in accuracy although the data amount transmitted to the buffer is increased. In this case, the picture quality of the decoded video signal is substantially the same as that of the original video signal.

The MPEG standard is not connected with the transmission rate control because it establishes a syntax of a bit stream inputted in the decoding process. Therefore, the transmission rate control is a know-how of the encoded which is capable of maintaining the picture quality at the maximum at a given band.

The MPEG2 algorithm has three coding modes, an intra mode (referred to hereinafter as I mode), a predicted mode (referred to hereinafter as P mode) and a dibirectionally predicted mode (referred to hereinafter as B mode), which will hereinafter be described in detail with reference to FIG. 1 which is a block diagram of an MPEG2 video encoder.

The I mode is to perform the coding using the video signal itself. The I mode is periodically performed for random access to a coded bit stream. Also, the I mode is required in preventing a degradation in the picture quality due to an error of a storage medium. A video signal of the I mode is used as a reference for video motion prediction in the p and B modes.

The P mode is to perform the coding by compensating for the motion from a previous video signal of the I or P mode.

The B mode is to perform the coding by compensating for the motion from the previous video signal of the I or P mode or the subsequent video signal of the I or P mode.

The video coding method in the I mode will hereinafter be described in detail.

In the video encoder of FIG. 1, a DCT unit 11 partitions pixels of a video frame into N×N blocks and performs the DCT for every block to remove the spatial redundancy of the video data. A quantizer 12 quantizes DCT coefficients from the DCT unit 11 using a desired step size. The quantized DCT coefficients from the quantizer 12 are converted into a one-dimensional array in a zig-zag scanning manner. The quantized DCT coefficients of the one-dimensional array are converted into the combination of 0 and 1 by a variable length coder (VLC) and then transmitted through the buffer to the transmission channel.

Before the conversion into the one-dimensional array, the quantized DCT coefficients are decoded by an inverse quantizer 13 and an inverse DCT unit 14 and then stored into a first frame memory 15. At this time, the video data stored in the first frame memory 15 has a quantization error because it is reproduced through the quantization and the inverse quantization.

The video coding method in the P mode is adapted to compress a bit rate by removing the time redundancy of the video information. In the video coding method in the P mode, the DCT, inverse DCT, quantization and inverse quantization operations are the same, as those in the I mode.

The motion estimation and the motion compensation are performed in the unit of macro block of 16×16 pixels. A motion estimator 18 compares the video data of the input block with video data of a previous frame from a second frame memory 17, not quantized. As a result of the comparison, the motion estimator 18 finds a motion vector positioning data analogous to the video data of the input block, in the second frame memory 17. A motion compensator 16 extracts a video data block corresponding to the motion vector, from a previous video frame stored in the first frame memory 15. Then, the extracted video data block is subtracted from the input block data and the resultant data is passed through the DCT unit 11 and the quantizer 12 to the transmission channel in the above-mentioned manner.

The video data and the motion vector transmitted in the P mode are combined with the previous video data by the decoder, resulting in production of a full picture.

The video coding method in the B mode is a compression method of reducing a prediction error by compensating for the motion using the previous and subsequent reference frames.

The operation of the encoder associated with the I, P and B modes is controlled by a mode selector 19.

The I, P and B-coded video data are combined to form a group of pictures (GOP) which can be directly accessed for the decoding with no previous video information. First coded video data must be the I-coded video data, which usually discriminates between the GOPs. It is preferred that the GOP has a small number of pictures so that it can be applied to the random access, a fast forward operation, and fast and normal reverse operations.

The present invention relates to a method of allocating a bit amount properly to the I, P and B-coded video data forming the GOP. In accordance with the present invention, a scene variation is sensed and the bit amount of the I and P-coded video data is adjusted in accordance with the sensed result, so that the picture quality of the decoded video data can be enhanced.

However, a conventional bit allocation method is adapted to estimate previously a bit amount to be generated in the coding in consideration of an input video characteristic, a coding mode, a transmission capacity and a required picture quality.

FIG. 2 is a view illustrating conventional coding modes for an input picture string in the MPEG2 video encoder. Three P mode pictures are inserted between two I mode pictures, and two B mode pictures are inserted between I and P mode pictures or between two P mode pictures. As a result, 12 pictures constitute one group. Each of the arrows indicates an operational relation between the respective mode pictures.

Now, a bit allocation method for the transmission rate control in a conventional MPEG2 test model 5 (TM5) with the construction as shown in FIG. 2 will be described in detail.

In the MPEG2 TM5, a bit amount is allocated differently according to the coding modes. Generally, in order to obtain the same picture quality, more bit amount must be allocated in the order off I, P and B mode pictures.

First, complexities $X_I$, $X_P$ and $X_B$ of the I, P and B mode pictures are defined as follows:

$$X_I = S_I \cdot Q_I \quad (1)$$

$$X_P = S_P \cdot Q_P \quad (2)$$

$$X_B = S_B \cdot Q_B \quad (3)$$

$S_I$, $S_P$ and $S_B$ are the number of bits of the just before coded video data of the respective modes and $Q_I$, $Q_P$ and $Q_B$ are average step sizes of the quantizer used in those cases, respectively. Namely, the coding complexity is defined as a multiplication of the bits number and the average quantizer step size in coding the previous picture.

Allocated bit amounts $T_I$, $T_P$ and $T_B$ of the I, P and B mode pictures are defined as follows:

$$T_I = \max \left\{ \frac{R}{1 + \frac{N_P X_P}{X_I K_P} + \frac{N_B X_B}{X_I K_B}}, \text{transmission rate}/(8 \cdot \text{inputs per sec}) \right\} \quad (4)$$

$$T_P = \max \left\{ \frac{R}{N_P + \frac{N_B K_P X_B}{K_B X_P}}, \text{transmission rate}/(8 \cdot \text{inputs per sec}) \right\} \quad (5)$$

$$T_B = \max \left\{ \frac{R}{N_B + \frac{N_P K_B X_P}{K_P X_B}}, \text{transmission rate}/(8 \cdot \text{inputs per sec}) \right\} \quad (6)$$

$K_P$ and $K_B$ have values different according to quantization matrices, and are 1.0 and 1.4 in the TM5, respectively. R is the bit amount remaining after the coding up to the just before picture among bits allocated to the entire picture group. $N_P$ is the number of the remaining P mode pictures of the picture group except the coded pictures and $N_B$ is the number of the remaining B mode pictures of the picture group except the coded pictures. Channel transmission rate/(8·inputs per sec) indicates a minimum number of bits to be allocated to each picture.

The above equations (4) to (6) used for the bit allocation in the MPEG2 TM5 signify that the bit amount a is allocated to the respect;ire I, P and B mode pictures according to the complexities $X_I$, $X_P$ and $X_B$ of the previously coded pictures of the same modes. However, when the input picture has a different characteristic due to the scene change, the complexities $X_I$, $X_P$ and $X_B$ of the previously coded pictures become insignificant. Particularly, in the case where the scene change is present in the P mode picture, most of macro blocks of the P mode picture muse be coded in the I mode because the motion compensation is impossible. Generally, the required number of bits in the I mode coding is at least twice that in the P mode coding. For this reason, the picture quality is degraded due to the shortage in the bits number of the P mode picture having the scene change. Also, the quality degradation of the P mode picture may have a bad effect on the subsequent B or P mode picture since the p mode picture is used as a reference for the motion-compensation.

SUMMARY OF THE INVENTION

Therefore, the present invention has been made in view of the above problems, and it is an object of the present invention to provide a bit allocation method for controlling a transmission rate of a video encoder in which, when a scene change is sensed, a bit amount approximate to that of an I mode picture is allocated to a P mode picture for its coding.

In accordance with the present invention, the above and other objects can be accomplished by a provision of a bit allocation method for controlling a transmission rate of a video encoder having an intra mode, a predicted mode and a bidirectionally predicted mode, comprising the steps of selecting one of the intra mode, the predicted mode and the bidirectionally predicted mode; checking whether a scene change indicating signal is outputted, if the intra mode is selected, allocating a bit amount corresponding to the intra mode to video data if it is checked that the scene change indicating signal is not outputted, coding the video data in the intra mode, allocating a bit amount corresponding to the predicted mode to the video data if it is checked that the scene change indicating signal is outputted, initializing the scene change indicating signal and coding the video data in the predicted mode; checking whether a scene change is present, if the predicted mode is selected, allocating the bit amount corresponding to the predicted mode to the video data if it is checked that the scene change is not present, coding the video data in the predicted mode, outputting the scene change indicating signal if it checked that the scene change is present, allocating a bit amount approximate to that corresponding to the intra mode to the video data and coding the video data in the predicted mode; and allocating a bit amount corresponding to the bidirectionally predicted mode to the video data if the bidirectionally predicted mode is selected and coding the video data in the bidirectionally predicted mode.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE INVENTION

Figure 1:
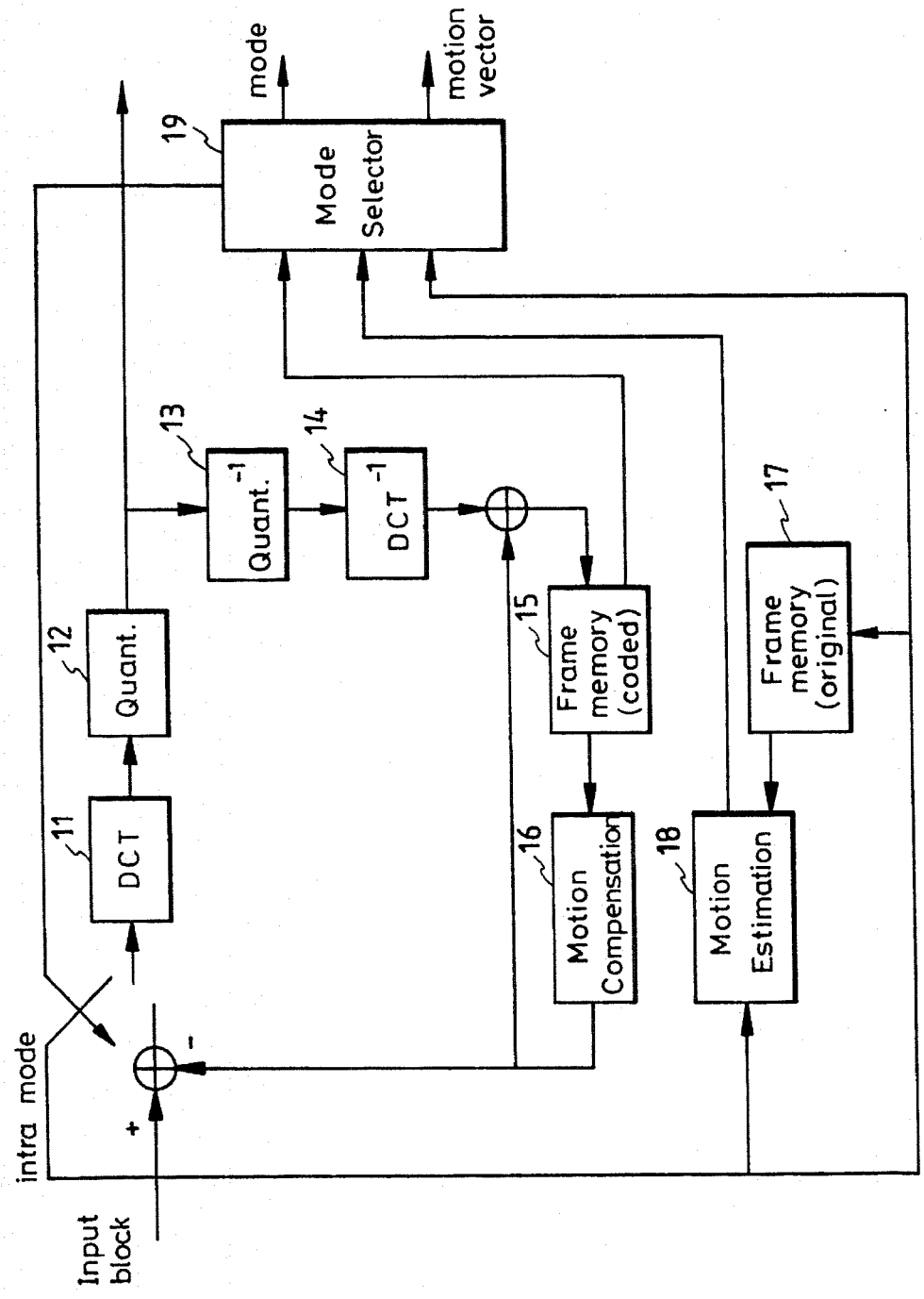
FIG. 1 is a block diagram of an MPEG2 video encoder.
Figure 2:
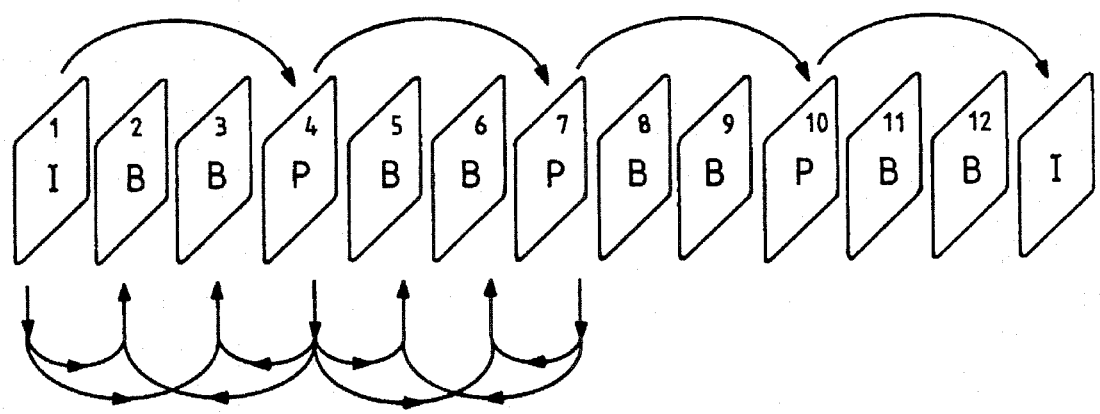
FIG. 2 is a view illustrating conventional coding modes for an input picture string in the MPEG2 video encoder of FIG. 1.
Figure 3:
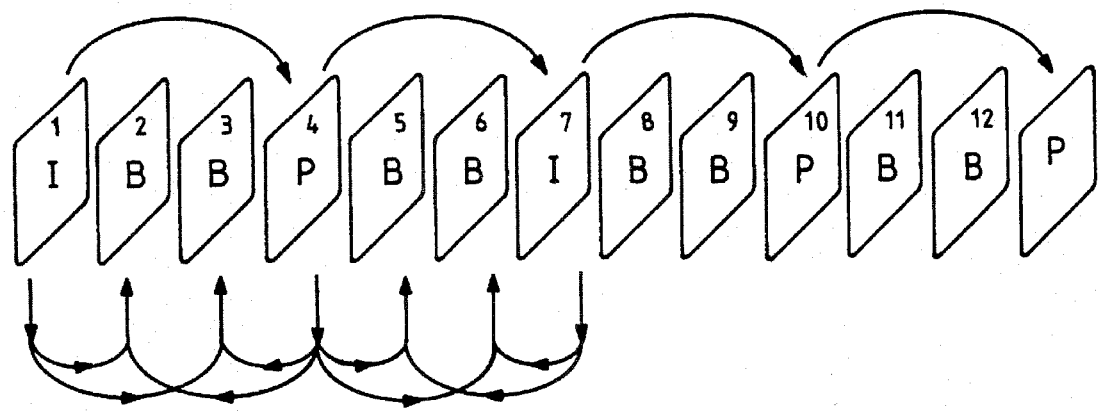
FIG. 3 is a view illustrating coding modes for an input picture string in the MPEG2 video encoder of FIG. 1 in accordance with the present invention.

Referring to FIG. 3, there is shown a view illustrating coding modes for an input picture string in the MPEG2 video encoder of FIG. 1 in accordance with the present invention. In FIG. 3, in the case where a scene change is generated in the second P mode picture of the picture group in FIG. 2, a bit amount approximate to that of the I mode picture is allocated to the corresponding P mode picture to code it. The subsequent I mode picture is coded in the P mode. Each of the arrows indicates an operational relation between the respective mode pictures.

When no scene change is present, the bit allocation is performed in the same manner as that in the conventional MPEG2 TM5. When the number of macro blocks of one picture, determined as the I mode, exceeds a half of the number of the entire macro blocks of that picture, the scene change is regarded as being generated.

In the case where the scene change is generated in the B mode picture, the motion compensation can be performed on the basis of the subsequent P mode picture. Therefore, it is efficient to detect the scene change only with respect to the P mode picture. The bit allocation to the p mode picture having the scene change can be expressed as follows:

$$T_P = \max \left\{ \frac{R+G}{1 + \frac{(N_P + N_P')X_P}{X_I K_P} + \frac{(N_B + N_B')X_B}{X_I K_B}} \omega, \frac{\text{transmission rate}}{8 \cdot \text{inputs per sec}} \right\} \quad (7)$$

$$G = \frac{\text{transmission rate} \times N}{\text{inputs per sec}} \quad (8)$$

$$\omega = \left\{ 1 - \frac{\text{scene change weight}}{N_P - 1} (N_P' - 1) \right\} \quad (9)$$

R is the remaining amount of bits allocated to the picture group. $N_P'$ is the number of the remaining P mode pictures of the picture group and $N_B'$ is the number of the remaining B mode pictures of the picture group. G is an initial value allocated to the picture group. $N_P$ and $N_B$ are initial values of $N_P'$ and $N_B'$, respectively. Namely, most of the macro blocks of the P mode picture having the scene change must be coded in the I mode. In this case, the picture quality may be degraded due to the shortage in the bits number of the P mode picture having the scene change. In order to prevent such a quality degradation, a length of the corresponding picture group is extended to the subsequent picture group and a bit amount approximate to that of the I mode picture is allocated to the corresponding P mode picture to code it.

On the other hand, when the bit amount approximate to that of the I mode picture is successively allocated to the corresponding P mode picture, it may overflow the buffer. In order to prevent such an overflow, a weight ω is multiplied according to a distance to the adjacent I mode picture. A scene change weight is a weight when the scene change is generated in the P mode picture subsequent to the I mode picture, and has a proper value within the range of 0.3 to 0.5.

As the bit amount being allocated to the P mode picture having the scene change is increased as in the above equation (7), the remaining bit amount R to be allocated to the picture group is relatively reduced, resulting in a quality degradation of the remaining pictures. In order to prevent such a quality degradation, the coding is performed up to the subsequent picture group in the following manner Namely R, $N_P'$ and $N_B'$ are updated into R+G, $N_P+N_P'$ and $N_B+N_B'$, respectively, the first picture of the subsequent picture group is coded in the P mode instead of the I mode and the coding is performed up to the subsequent picture group using the updated values.

Figure 4:
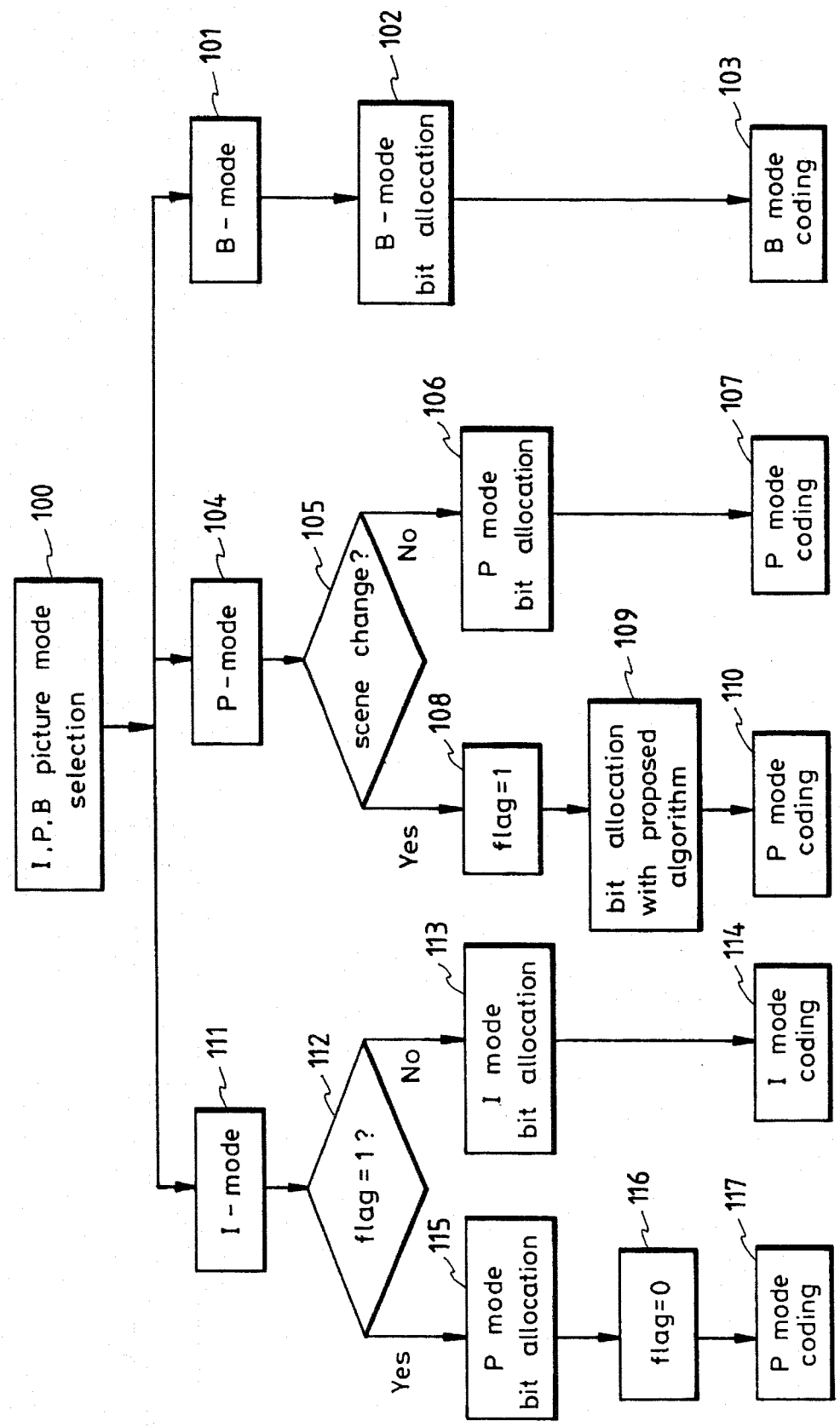
FIG. 4 is a flowchart illustrating a bit allocation method in accordance with the present invention.

Referring to FIG. 4, there is shown a flowchart illustrating the bit allocation method in accordance with the present invention. First, one of the I, P and B modes is selected at the step 100. If the B mode is selected at the step 100, a bit amount corresponding to the B mode is allocated to video data at the step 102 and the video data is coded in the B mode at the step 103.

In the case where the P mode is selected at the step 100, it is checked at the step 105 whether the scene change is present. If it checked at the step 105 that the scene change is not present, a bit amount corresponding to the P mode is allocated to the video data at the step 106 and the video data is coded in the P mode at the step 107. On the contrary, if it checked at the step 105 that the scene change is present, a scene change flag signal is set to "1" at the step 108 and a bit amount corresponding to the equation (7) is allocated to the video data according to the algorithm proposed by the present invention at the step 109. Then, the video data is coded in the P mode at the step 110.

In the case where the I mode is selected at the step 100, it is checked at the step 112 whether the scene change flag signal is "1". If it is checked at the step 112 that the scene change flag signal is not "1", a bit amount corresponding to the I mode is allocated to the video data at the step 113 and the video data is coded in the I mode at the step 114. On the contrary, if it is checked at the step 112 that the scene change flag signal is "1", the bit amount corresponding to the P mode is allocated to the video data at the step 115 and the scene change flag signal is set to "0" at the step 116. Then, the video data is coded in the P mode at the step 117.

The bit allocation method of the present invention may be applied to all the DCT/DPCM composite coding methods performing the DCT and the motion compensation, as well as the MPEG2 video algorithm.

As apparent from the above description, according to the present invention, when the scene change in the P mode picture is sensed, the bit allocation amount to the P mode picture is appropriately increased and the bit increase amount is compensated by the bit amount allocated to the subsequent picture group. Therefore, the quality degradation of the P mode picture can be prevented. Also, the quality of the subsequent B or P mode picture can be enhanced since the P mode picture is used as a reference for the motion compensation thereof.

The encoder satisfying the MPEG2 video standard can efficiently cope with the scene change of the input picture by using the bit allocation method for the transmission rate control proposed by the present invention. Therefore, the video encoder has the effect of providing the excellent picture quality.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A bit allocation method for controlling a transmission rate of a video encoder having an intra mode, a predicted mode and a bidirectionally predicted mode, comprising the steps of:

selecting one of the intra mode, the predicted mode and the bidirectionally predicted mode;

checking whether a scene change is present, if the predicted mode is selected, allocating a bit amount corresponding to the predicted mode to the video data if it is checked that the scene change is not present, coding the video data in the predicted mode, outputting a scene change indicating signal if it is checked that the scene change is present, allocating a bit amount approximate to that corresponding to the intra mode to the video data and coding the video data in the predicted mode;

checking whether a scene change indicating signal is outputted, if the intra mode is selected, allocating a bit amount corresponding to the intra mode to video data if it is checked that the scene change indicating signal is not outputted, coding the video data in the intra mode, allocating a bit amount corresponding to the predicted mode to the video data if it is checked that the scene change indicating signal is outputted, initializing the scene change indicating signal and coding the video data in the predicted mode; and allocating a bit amount corresponding to the bidirectionally predicted mode to the video data if the bidirectionally predicted mode is selected and coding the video data in the bidirectionally predicted mode.

2. A bit allocation method as set forth in claim 1, wherein the scene change indicating signal is outputted when a number of macro blocks of one picture, determined as the intra mode, exceeds a half of the number of the entire macro blocks of that picture.

\* \* \* \* \*